(12) United States Patent
Fang et al.

(10) Patent No.: US 6,904,223 B1
(45) Date of Patent: Jun. 7, 2005

(54) TILTED-TRANSLATION VARIABLE OPTICAL ATTENUATOR

(75) Inventors: Zuyun Fang, Henderson, NV (US); Jianhua Wang, Saratoga, CA (US); Jian J. Chen, Fremont, CA (US)

(73) Assignee: Optiworks, Inc., Fremont, CA (US)

( * ) Notice: Subject to any disclaimer, the term of this patent is extended or adjusted under 35 U.S.C. 154(b) by 235 days.

(21) Appl. No.: 10/408,073

(22) Filed: Apr. 4, 2003

(51) Int. Cl.[7] .............................................. G02B 6/00
(52) U.S. Cl. ................................... 385/140; 385/134
(58) Field of Search ............................. 385/15, 33, 36, 385/140, 134

(56) References Cited

U.S. PATENT DOCUMENTS

| | | | | |
|---|---|---|---|---|
| 4,516,827 A | 5/1985 | Lance et al. | ............... | 385/140 |
| 5,325,459 A | 6/1994 | Schmidt | ............... | 385/140 |
| 5,781,341 A | 7/1998 | Lee | ............... | 359/578 |
| 6,130,984 A | 10/2000 | Shen et al. | ............... | 385/140 |
| 6,137,941 A | 10/2000 | Robinson | ............... | 385/140 |
| 6,149,278 A | 11/2000 | Mao et al. | ............... | 359/862 |
| 6,304,709 B1 | 10/2001 | Fujita | ............... | 385/140 |
| 6,483,982 B1 | 11/2002 | Takahashi | ............... | 385/140 |
| 6,529,673 B1 * | 3/2003 | Liu et al. | ............... | 385/140 |
| 2003/0026582 A1 * | 2/2003 | Hout et al. | ............... | 385/140 |
| 2003/0049010 A1 * | 3/2003 | Yu et al. | ............... | 385/140 |

* cited by examiner

*Primary Examiner*—Akm Enayet Ullah
*Assistant Examiner*—Jennifer Doan
(74) *Attorney, Agent, or Firm*—Andrei D. Popovici

(57) ABSTRACT

In a preferred embodiment, a motorized variable optical attenuator comprises an input fiber collimator; an output fiber collimator disposed substantially along the first collimator; and a right-angle reflector movable relative to the input collimator and the output collimator along a translation direction forming a non-zero angle with a direction of a light beam emitted by the input collimator. The reflector comprises two mutually-perpendicular reflective surfaces for sequentially reflecting the light beam emitted by the input collimator to the output collimator. A variable attenuation imparted by the attenuator on the light beam is determined by a position of the reflector relative to the input collimator and the output collimator, along the translation direction. The reflector preferably comprises a right-angle prism adhered to a nut mounted on a threaded axle driven by a stepper motor. The attenuator can achieve stable, ripple-free attenuation characteristics at insertion losses beyond −40 dB.

27 Claims, 3 Drawing Sheets

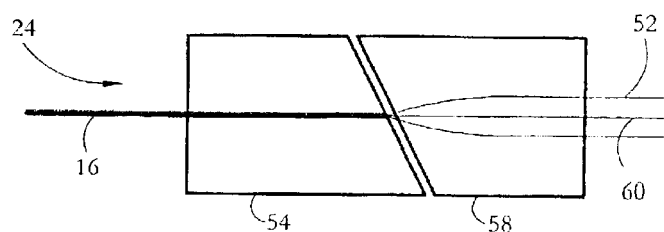
FIG. 4-A
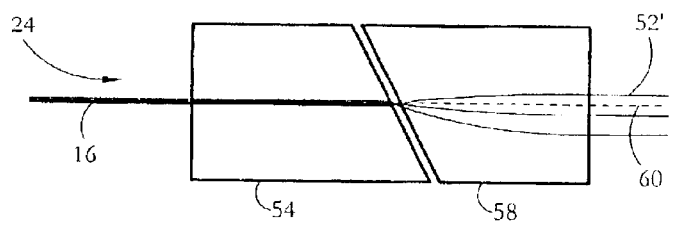
FIG. 4-B
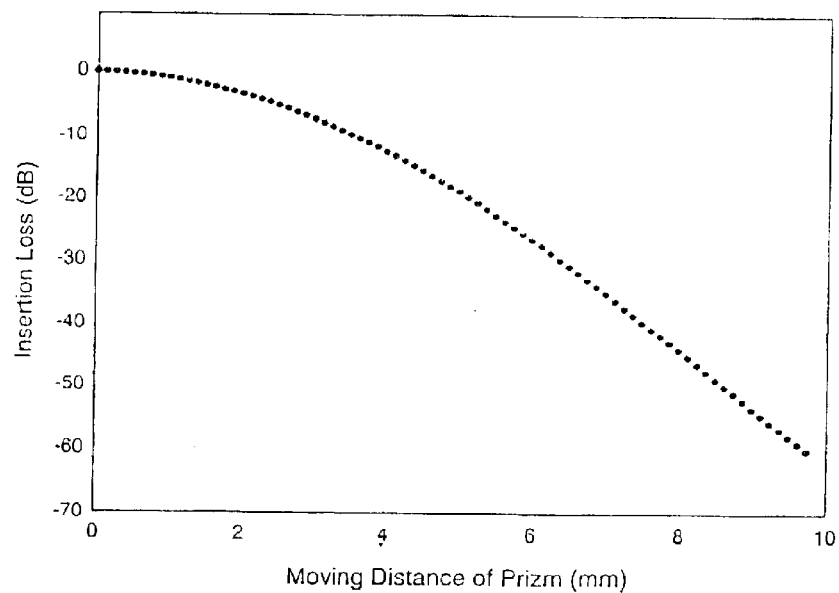
FIG. 5

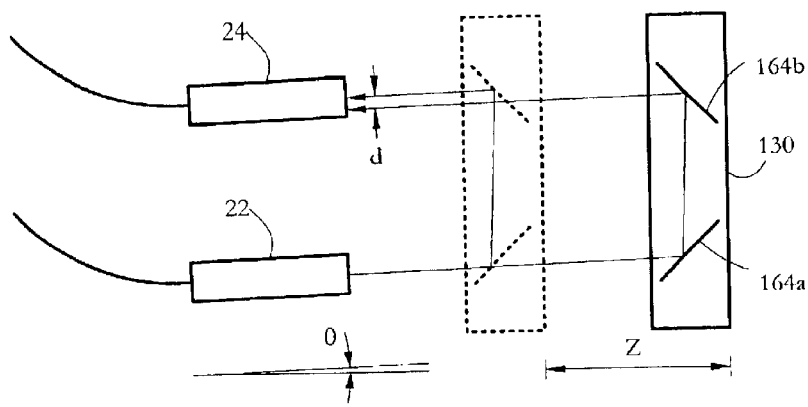
FIG. 6-A
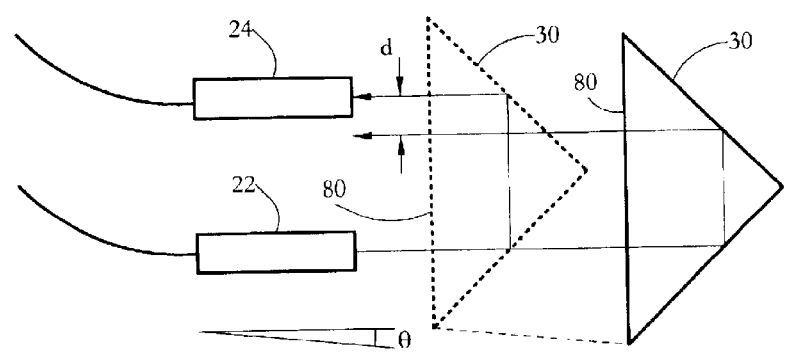
FIG. 6-B
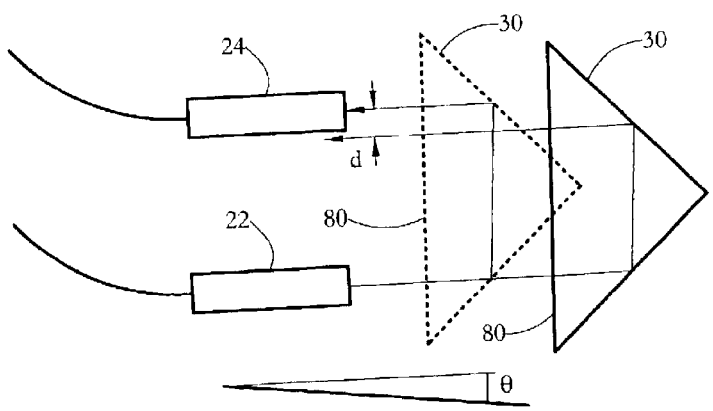
FIG. 6-C

TILTED-TRANSLATION VARIABLE OPTICAL ATTENUATOR

FIELD OF THE INVENTION

The invention in general relates to optical systems and methods, and in particular to systems and methods for performing variable optical attenuation.

BACKGROUND

Variable optical attenuators are used to attenuate light beams in optical systems such as fiber optic communication systems. Controllably attenuating a light beam can be achieved by various methods, such as by passing the beam through a variable-attenuation (e.g. wedge-shaped) filter, radially bending a fiber loop to vary the optical loss within the loop, partially blocking the beam by inserting a beam block into the light beam path, and moving a mirror relative to one or more fibers to alter the efficiency of light coupling to/from the fibers.

In U.S. Pat. No. 6,304,709, Fujita describes a variable optical attenuator comprising two parallel fibers with their end faces positioned facing a planar mirror. A convergent lens is placed between the fiber end faces and the mirror. A light beam emitted by the first fiber is reflected by the planar mirror back into the second fiber. To vary the optical attenuation imparted by the attenuator, the mirror is moved linearly so as to vary the distance between the mirror and the two fiber end faces. Other variable optical attenuators employing parallel fibers facing a reflective surface are described for example by Robinson in U.S. Pat. No. 6,137,941, and Takahashi in U.S. Pat. No. 6,483,982.

SUMMARY OF THE INVENTION

In a preferred embodiment, a motorized variable optical attenuator comprises an input fiber collimator; an output fiber collimator disposed substantially along the first collimator; and a right-angle reflector movable relative to the input collimator and the output collimator along a translation direction forming a non-zero angle with a direction of a light beam emitted by the input collimator. The reflector comprises two mutually-perpendicular reflective surfaces for sequentially reflecting the light beam emitted by the input collimator to the output collimator. A variable attenuation imparted by the attenuator on the light beam is determined by a position of the reflector relative to the input collimator and the output collimator, along the translation direction.

BRIEF DESCRIPTION OF THE DRAWINGS

The foregoing aspects and advantages of the present invention will become better understood upon reading the following detailed description and upon reference to the drawings where:

FIGS. 4-A and 4-B illustrate an optimally-aligned and suboptimally-aligned beam, respectively, incident on an output collimator of the optical attenuator of FIG. 2.

FIG. 5 shows a measured variation of insertion loss with reflector position for an attenuator such as the one shown in FIG. 2, according to an embodiment of the present invention.

FIGS. 6-A–C illustrate modifications that can be made to the attenuator of FIG. 2 according to several embodiments of the present invention.

DETAILED DESCRIPTION OF THE INVENTION

In the following discussion, a set of elements is understood to include one or more elements. Moving a first element relative to a second element encompasses moving the first element, the second element, or both, relative to a fixed structure such as a housing. Unless explicitly specified otherwise, a first surface (e.g. a collimator end face) parallel to a second surface encompasses coplanar first and second surfaces as well as parallel surfaces whose planes are separated by a non-zero distance. A first collimator placed along a second collimator is generally on the same side of a reflector as the second collimator and faces in the same general direction, and can be adjacent to the second collimator or can be separated from the second collimator by some distance.

The following description illustrates embodiments of the invention by way of example and not necessarily by way of limitation.

It was observed that a variable optical attenuator employing a dual-fiber collimator and a movable planar mirror facing the dual-fiber collimator can suffer from attenuation fluctuations (ripples) in an attenuation dynamic range beyond about 40 dB. Such attenuation fluctuations can be caused by interference between the attenuation light and scattered light inside the dual-fiber collimator. Employing separate input and output collimators in conjunction with a tilted, movable dual-surface reflector (e.g. a right-angle prism) as described below allows achieving stable attenuation characteristics for attenuation values below −40 dB, and in particular beyond −60 dB, with high attenuation resolutions.

Figure 1:
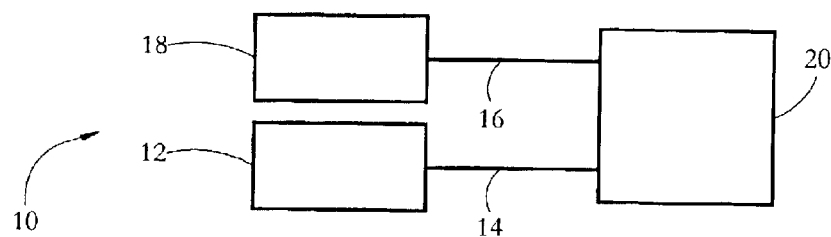
FIG. 1 is a schematic diagram of an optical system including a variable optical attenuator of the present invention.

FIG. 1 shows a schematic diagram of an optical system 10 including a variable optical attenuator (VOA) 20 of the present invention. Optical system 10 can be for example an optical communications system. Optical system 10 includes an optical source 12 and an optical receiver 18 in optical communication with VOA 20 over corresponding input and output optical links such as optical fibers 14, 16, respectively. Source 12 directs a modulated light beam through input fiber 14 to VOA 20, and receiver 18 receives the light beam after passage through VOA 20 and output fiber 16. The light beam can comprise multiple channels each encoding a communications signal. Source 12 may include one or more lasers or laser diodes, optical fibers, and other optical components (e.g. WDM/DWDM components) between the laser(s) and VOA 20. Receiver 18 may include one or more detectors, optical fibers, and other optical components between the detector and VOA 20. VOA 20 is capable of imparting a controlled, variable optical attenuation on the light beam.

Figure 2:
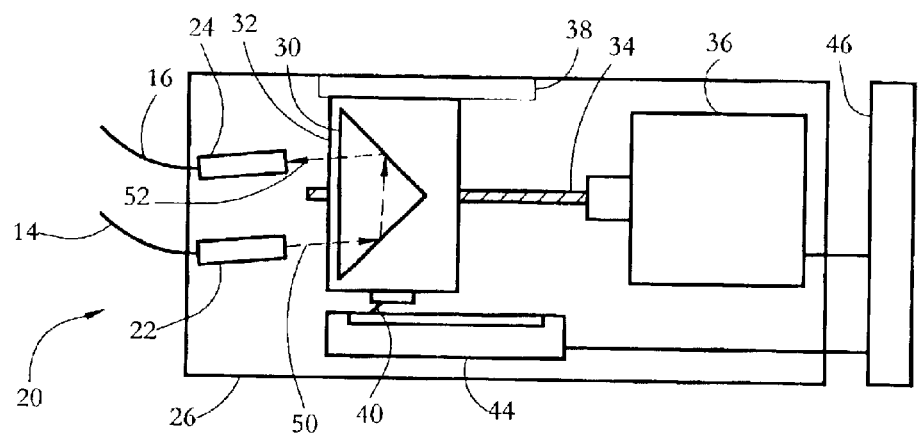
FIG. 2 shows a motorized variable optical attenuator according to a preferred embodiment of the present invention.

FIG. 2 shows a schematic diagram of VOA 20 according to a preferred embodiment of the present invention. VOA 20 comprises an input collimator 22 and an output collimator 24 fixedly mounted within a housing schematically shown at 26. Collimators 22, 24 are positioned adjacently along one another and face generally the same direction. Collimators 22, 24 are preferably situated as close to each other as possible without touching, for example about 1 mm or less apart, so as to allow the relative alignment of collimators 22, 24 during the assembly of VOA 20. In a present implementation, collimators 22, 24 are graded index (GRIN) collimators, each including a GRIN lens. In general, each collimator 22, 24 may include a C-lens, D-lens, ball lens, or any other optical fiber lens. The collimator lens has a diameter preferably on the order of one to a few mm, for example about 1.8 mm. A right-angle (e.g. corner cube) reflecting prism 30 faces collimators 22, 24. The in-plane sides of prism 30 are preferably on the order of mm in length, for example about 3 to 5 mm. The end faces of collimators 22, 24 and the front surface of prism 30 are preferably anti-reflection (AR) coated.

Prism 30 is preferably fixedly mounted on a movable carriage or nut 32 capable of translational movement relative to collimators 22, 24 and housing 26. Nut 32 is preferably mounted on a finely threaded (e.g. 0.25 mm pitch) axle 34 driven by a stepper motor 36. A guiding mechanism such as one or more longitudinal rails 38 can contact nut 32 laterally in order to reduce any wobbling or other non-longitudinal motion of nut 32. A wiper 40 mounted on nut 32 can slide along a contact surface of a linear potentiometer 44 as nut 32 moves along axle 34. Potentiometer 44 can be used to determine the position of prism 30, and thus the attenuation imparted by VOA 20. Control electronics 46 are electrically connected to motor 36 and to potentiometer 44, for receiving prism position data from potentiometer 44 and for controlling the position of prism 30 to achieve desired levels of attenuation. Control electronics 46 can include a voltage converter for producing a voltage signal linear with the insertion loss produced by attenuator 20.

The direction of motion of prism 30, which is determined by the orientation of axle 34, preferably forms a non-zero angle $\theta$ with the direction along which collimators 22, 24 are oriented, as described in detail below. The angle $\theta$ is preferably between 1° and 45°, more preferably between 1° and 10°, for example between 2° and 4°. Preferably, the direction of motion of prism 30 coincides with a normal to the front face of prism 30. Moving prism 30 along the normal to the front face of prism 30 allows simplifying the design and fabrication of the assembly formed by prism 30, nut 32, and axle 34, before the assembly is coupled and aligned to collimators 22, 24. The longitudinal position of prism 30 relative to collimators 22, 24 determines the attenuation imparted by VOA 20. Preferably, prism 30 can be moved between proximal and distal positions situated about 5 and 15 mm away, respectively, from collimators 22, 24.

A collimated input light beam 50 emitted by input collimator 22 is reflected by prism 30, and is received by output collimator 24 as an output light beam 52. Input and output light beams 50, 52 are parallel. Each light beam is perpendicular to the end face of its respective collimator. Input light beam 50 is reflected by a first planar reflective surface 64a of prism 30 toward a second planar reflective surface 64b of prism 30. The first and second planar reflective surfaces 64a–b are mutually orthogonal. The output light beam reflected by the second reflective surface 64b is incident on output collimator 24.

Figure 3:
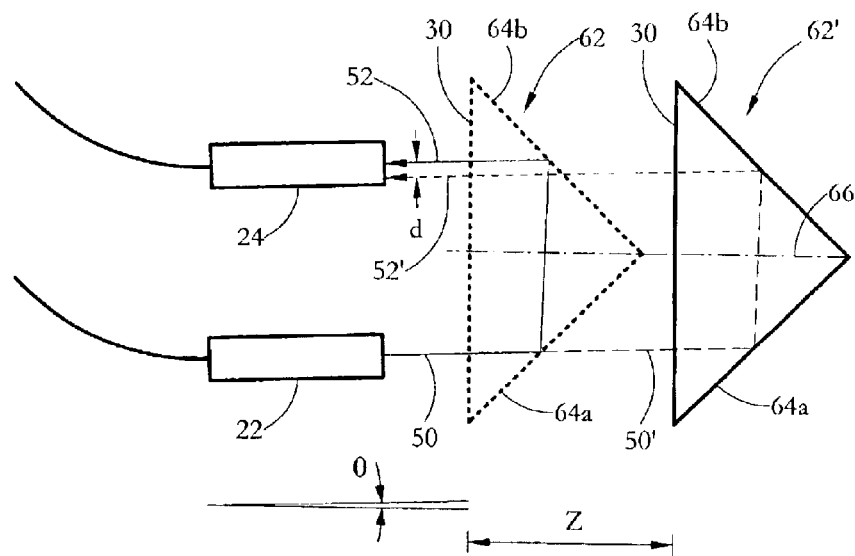
FIG. 3 illustrates schematically a light beam passing through the attenuator of FIG. 2, for two reflector positions.

FIG. 3 illustrates the trajectories of the light beam through VOA 20 for two reflector positions 62, 62'. In a first reflector position 62 corresponding to a minimum attenuation, an input light beam 50 emitted by input collimator 22 is reflected sequentially by two orthogonal reflective surfaces 64a–b of prism 30. Reflective surfaces 64a–b are disposed symmetrically about a central longitudinal axis 66 of prism 30, which preferably coincides with a normal to the front surface of prism 30 and the direction of translation of prism 30. The resulting output light beam 52 is directed to the center of output collimator 24, and light is optimally coupled into collimator 24. Position 62 corresponds to an alignment of collimators 22, 24 and prism 30 that results in a minimal insertion loss. In a second prism position 62' corresponding to a higher attenuation, an input light beam 50' is incident on different points along reflective surfaces 64a–b than input light beam 50. The resulting output light beam 52' is directed to an off-center location on output collimator 24, and light is suboptimally coupled into collimator 24. Position 62' results in a higher insertion loss than position 62.

The displacement d between the output light beams 52, 52' is given by $$d = Z \sin\theta \quad [1]$$

where Z is the longitudinal distance between the two prism positions 62, 62', and $\theta$ is the angle between the light beam direction defined by collimators 22, 24 and the direction of movement of prism 30 (z-direction). The angle $\theta$ can be chosen such that the total range of movement of prism 30 corresponds to the maximum desired attenuation dynamic range. In an arrangement such as the one shown in FIG. 2 and employing typical GRIN collimators, an angle $\theta=2.3°$ was chosen to achieve a stable (ripple-free) dynamic range of −60 dB for a translation distance Z=10 mm. Suitable translation range values can be on the order of several mm to several cm, while suitable $\theta$ values can range from tenths of a degree to tens of degrees, depending on the desired attenuation dynamic range.

FIGS. 4-A and 4-B illustrate schematically two output light beams 52, 52', respectively, incident on a GRIN output collimator 24 for two corresponding positions of prism 30 such as the ones shown in FIG. 3. Collimator 24 comprises a pigtail 54 holding fiber 16, and a graded-index (GRIN) lens 58 attached to pigtail 54. The center of beam 52 (FIG. 4-A) coincides with a central axis 60 of lens 58, and beam 52 is optimally coupled into fiber 16, without significant loss. The center of beam 52' (FIG. 4-B) is displaced from central axis 60. Part of beam 52' is incident on fiber 16 at an angle outside of the numerical aperture of fiber 16, and thus does not couple into fiber 16.

FIG. 5 shows experimentally-measured attenuation data as a function of prism position for a variable optical attenuator such as the one shown in FIG. 2, as the prism moves away from the position of minimum insertion loss. The data was taken using GRIN collimators, and an angle $\theta=2.3°$ between the collimators' axis and the prism translation direction. The attenuation was observed to scale according to the empirical equation $$\Delta IL \propto Z^{1/8} \quad [2]$$

where $\Delta IL$ is the change in insertion loss and Z is the prism translation distance. The attenuation was observed to vary monotonously and smoothly, without ripples, for insertion losses exceeding −60 dB. By contrast, it was observed that a variable optical attenuator comprising a dual-fiber collimator facing a planar mirror can display fluctuations in attenuation for insertion losses starting at about −40 dB.

FIG. 6-A illustrates a VOA 120 according to another embodiment of the present invention. VOA 120 differs from the attenuator shown in FIG. 2 in that a reflector comprising two separate orthogonal mirrors 164a–b is used instead of a right-angle prism reflector. FIG. 6-B shows a VOA 220 according to yet another embodiment of the present invention. The light beam is perpendicular to the front surface 80 of prism 30, and forms a 45° angle with each reflective surface of prism 30. The direction of translation of prism 30 is not orthogonal to the front surface 80. As in the embodiment shown in FIG. 2, the direction of translation of prism 30 forms a non-zero angle θ relative to the direction of the light beam defined by the orientations of collimators 22, 24. FIG. 6-C shows a VOA 320 according to still another embodiment of the present invention. The front surface 80 of prism 30 is not orthogonal to the light beam or the direction of translation of prism 30.

The preferred attenuator described above allows achieving interference-ripple-free attenuations at insertion losses between −40 dB and −60 dB and beyond. The use of a small number of optical components (two collimators and a prism) reduces the attenuator's sensitivity to optical damage at high power. The prism normally introduces almost no optical loss at its optimal alignment position, and thus the minimal insertion loss introduced by the attenuator is negligible. Moreover, assembling the attenuator and in particular aligning the two collimators relative to the reflector can be achieved with relative simplicity.

It will be clear to one skilled in the art that the above embodiments may be altered in many ways without departing from the scope of the invention. For example, translating the reflector relative to the collimators can be achieved by keeping the reflector fixed and translating an assembly comprising the collimators. A shutter can be inserted in the optical path of the light beam to turn off the light beam completely. Accordingly, the scope of the invention should be determined by the following claims and their legal equivalents.

What is claimed is:

1. A variable optical attenuator comprising:
    an input fiber collimator;
    an output fiber collimator disposed substantially along the first collimator; and
    a right-angle reflector comprising two mutually-perpendicular reflective surfaces for sequentially reflecting a light beam received from the input collimator to the output collimator, the reflector being movable relative to the input collimator and the output collimator along a translation direction forming a non-zero angle with a direction of the light beam received from the input collimator, wherein a variable attenuation imparted by the attenuator to the light beam is determined by a position of the reflector relative to the input collimator and the output collimator along the translation direction.

2. The attenuator of claim 1, wherein the non-zero angle is between 1° and 10°.

3. The attenuator of claim 1, wherein the non-zero angle is between 2° and 4°.

4. The attenuator of claim 1, wherein the reflector comprises a right-angle prism.

5. The attenuator of claim 1, wherein the reflector comprises two separate perpendicular planar mirrors.

6. The attenuator of claim 1, wherein the variable attenuation imparted by the attenuator varies monotonously over a dynamic range of 0 to −60 dB.

7. The attenuator of claim 1, wherein:
    the reflective surfaces are disposed symmetrically about a reflector central axis, and the reflector central axis substantially coincides with the translation direction.

8. The attenuator of claim 1, wherein:
    the reflective surfaces are disposed symmetrically about a reflector central axis, and the central axis substantially coincides with the direction of the light beam received from the input collimator.

9. The attenuator of claim 1, wherein the reflector is coupled to a motor for controlling the position of the reflector along the translation direction.

10. The attenuator of claim 9, wherein the reflector is mounted on a nut coupled to the motor through a longitudinal threaded axle defining the translation direction, and wherein the nut contacts a generally longitudinal guiding rail for constraining a motion of the nut to the translation direction.

11. The attenuator claim 1, further comprising a position detector for measuring the position of the reflector relative to the input collimator and the output collimator.

12. The attenuator of claim 1, wherein each of the input collimator and output collimator comprises a graded index lens.

13. A variable optical attenuator comprising:
    an input fiber collimator;
    an output fiber collimator disposed substantially along the first collimator; and
    a reflector movable relative to the input collimator and the output collimator along a translation direction forming a non-zero angle with a direction of a light beam received from the input collimator, the reflector comprising two reflective surfaces for sequentially reflecting the light beam emitted by the input collimator to the output collimator, wherein a variable attenuation imparted by the attenuator to the light beam is determined by a position of the reflector relative to the input collimator and the output collimator along the translation direction.

14. A variable optical attenuator comprising a pair of optical fibers having parallel outputs disposed facing a right-angle reflector, the reflector comprising two mutually-perpendicular reflective surfaces for sequentially reflecting a light beam received from a first fiber of the pair to a second fiber of the pair, the reflector being movable relative to the pair of fibers along a translation direction forming a non-zero angle with an orientation of the outputs, wherein a variable attenuation imparted by the attenuator to the light beam is determined by a position of the reflector relative to pair of fibers along the translation direction.

15. An optical communications system comprising:
    an optical source for generating a light beam;
    a variable optical attenuator for imparting a variable optical attenuation to the light beam, comprising:
        an input fiber collimator optically coupled to the light source, for receiving the light beam;
        an output fiber collimator disposed substantially along the first collimator; and
        a right-angle reflector comprising two mutually-perpendicular reflective surfaces for sequentially reflecting a light beam received from the input collimator to the output collimator, the reflector being movable relative to the input collimator and the output collimator along a translation direction forming a non-zero angle with a direction of the light beam received from the input collimator, wherein a variable attenuation imparted by the attenuator to the light beam is determined by a position of the reflector relative to the input collimator and the output collimator along the translation direction; and
    an optical receiver optically coupled to the output fiber collimator, for receiving the light beam.

16. A variable optical attenuation method comprising:

employing two mutually-perpendicular reflective surfaces of a right-angle reflector to sequentially reflect a light beam received from an input fiber collimator to an output fiber collimator; and moving the reflector relative to the input collimator and the output collimator along a translation direction forming a non-zero angle with a direction of the light beam received from the input collimator, wherein a variable attenuation imparted by the attenuator to the light beam is determined by a position of the reflector relative to the input collimator and the output collimator along the translation direction.

17. The method of claim 16, wherein the non-zero angle is between 1° and 10°.

18. The method of claim 16, wherein the non-zero angle is between 2° and 4°.

19. The method of claim 16, wherein the reflector comprises a right-angle prism.

20. The method of claim 16, wherein the reflector comprises two separate perpendicular planar mirrors.

21. The method of claim 16, wherein the variable attenuation imparted by the attenuator varies monotonously over a dynamic range of 0 to −60 dB.

22. The method of claim 16, wherein:

the reflective surfaces are disposed symmetrically about a reflector central axis, and the reflector central axis substantially coincides with the translation direction.

23. The method of claim 16, wherein:

the reflective surfaces are disposed symmetrically about a reflector central axis, and the central axis substantially coincides with the direction of the light beam received from the input collimator.

24. The method of claim 16, further comprising employing a motor coupled to the reflector to control the position of the reflector along the translation direction.

25. The method of claim 24, further comprising mounting reflector on a nut, coupling the nut to the motor through a longitudinal threaded axle defining the translation direction, and contacting the nut to a generally longitudinal guiding rail for constraining a motion of the nut to the translation direction.

26. The method of claim 16, further comprising employing a position detector tom measure the position of the reflector relative to the input collimator and the output collimator.

27. The method of claim 16, wherein each of the input collimator and output collimator comprises a graded index lens.

* * * * *